US012786666B2

(12) United States Patent
Ady et al.

(10) Patent No.: US 12,786,666 B2
(45) Date of Patent: Nov. 3, 2026

(54) POWER-EFFICIENT TRACKING USING MACHINE-LEARNED PATTERNS AND ROUTINES

(71) Applicant: Tile, Inc., San Mateo, CA (US)

(72) Inventors: Roger William Ady, Chicago, IL (US); John A. Renaldi, Park Ridge, IL (US); David E. Stude, Barrington, IL (US)

(73) Assignee: Tile, Inc., San Mateo, CA (US)

( * ) Notice: Subject to any disclaimer, the term of this patent is extended or adjusted under 35 U.S.C. 154(b) by 448 days.

(21) Appl. No.: 17/957,792

(22) Filed: Sep. 30, 2022

(65) Prior Publication Data

US 2024/0114316 A1 Apr. 4, 2024

(51) Int. Cl.

| | |
|---|---|
| ***H04W 4/029*** | (2018.01) |
| ***G01S 5/02*** | (2010.01) |
| ***G06N 5/022*** | (2023.01) |
| ***H04W 4/02*** | (2018.01) |

(52) U.S. Cl.

CPC ........... *H04W 4/029* (2018.02); *G01S 5/0294* (2013.01); *G06N 5/022* (2013.01); *H04W 4/023* (2013.01)

(58) Field of Classification Search

CPC ..... H04W 4/029; H04W 4/023; H04W 4/025; G06N 20/00; G06N 20/10; G06N 20/20; G06N 3/045; G06N 3/09; G06N 3/088; G06N 3/0895; G01S 5/0278; G01S 2205/01; G01S 2205/09

See application file for complete search history.

(56) References Cited

U.S. PATENT DOCUMENTS

| | | | | |
|---|---|---|---|---|
| 10,869,173 | B2 | 12/2020 | Väänänen | |
| 11,200,807 | B2 * | 12/2021 | Beaurepaire | G08G 1/14 |
| 2011/0080264 | A1 | 4/2011 | Clare et al. | |
| 2017/0280299 | A1 | 9/2017 | Kamlani | |

(Continued)

FOREIGN PATENT DOCUMENTS

| | | | |
|---|---|---|---|
| JP | 2000-235660 | A | 8/2000 |
| JP | 2006-250918 | A | 9/2006 |
| KR | 10-2022-0094416 | A | 7/2022 |

OTHER PUBLICATIONS

International Search Report and Written Opinion, Patent Cooperation Treaty Application No. PCT/US2023/032171, Dec. 26, 2023, 14 pages.

(Continued)

*Primary Examiner* — Umair Ahsan
(74) *Attorney, Agent, or Firm* — FENWICK & WEST LLP

(57) ABSTRACT

A method comprises accessing historical signal and other information received from a tracking device configured to scan for signals transmitted by local devices and record other data as the tracking device moves within the geographic area during each of a plurality time intervals. A training dataset is generated based on the historical signal and other information and used to train a machine learning model configured to predict tracking device movement patterns. The machine learning model is applied to current signal and other information to detect a variance from one or more predefined routines associated with the tracking device. A notification is sent to a monitoring device associated with the tracking device in response to detecting the variance from the one or more predefined routines associated with the tracking device.

10 Claims, 9 Drawing Sheets

(56) References Cited

U.S. PATENT DOCUMENTS

| | | | | |
|---|---|---|---|---|
| 2018/0219759 | A1* | 8/2018 | Brown | G06Q 10/109 |
| 2018/0290621 | A1 | 10/2018 | Seaman et al. | |
| 2019/0370726 | A1* | 12/2019 | Ha | G06Q 10/063114 |
| 2020/0096599 | A1 | 3/2020 | Hewett et al. | |
| 2024/0062129 | A1* | 2/2024 | Porrata | G06N 3/08 |
| 2024/0114317 | A1 | 4/2024 | Ady et al. | |
| 2024/0242591 | A1* | 7/2024 | Wu | H04L 67/12 |
| 2024/0395419 | A1* | 11/2024 | Jain | G16H 80/00 |

OTHER PUBLICATIONS

United States Office Action, U.S. Appl. No. 17/957,804, Dec. 4, 2024, 18 pages.

* cited by examiner

POWER-EFFICIENT TRACKING USING MACHINE-LEARNED PATTERNS AND ROUTINES

BACKGROUND

1. Field of the Disclosure

This disclosure relates generally to electronic tracking devices, and more specifically, to systems and methods of efficient tracking using machine-learned patterns.

2. Description of the Related Art

Electronic tracking devices have created numerous ways for people to track the locations of people, objects, and the like. For example, a user can use GPS technology to determine a location of an electronic device. In another example, a user can attach a tracking device to people, animals, or objects of value to avoid losing them.

SUMMARY

A tracking device scans access point signals and other signals from nearby devices, determining and recording associated signal strengths as the tracking device moves along its path through a geographic area. In some embodiments, on-board sensor information and other information associated with the tracking device is captured and stored. As the tracking device is used over time, one or more machine learning models are applied to the historical signal and other sensor-derived information to discern recurring patterns in the historical signal and other information, and the recurring patterns are mapped to a schedule, events, calendar reference, or other time-based reference to identify routines. For example, the routines may be indicative of a tracked subject's typically traveled paths throughout a given week, such as the tracked subject's path when traveling to and from work, school, and home and when conducting various regular activities. When the same pattern of signal information is detected by the tracking device in accordance with a routine, within a predefined or learned tolerance, then the tracking device may avoid certain types of power-intensive transmissions, such as communication with a global positioning system (GPS). In addition, the tracking device may discern the device is traversing a routine path even when certain locational systems are not available, as when in a building or on a subway where GPS and/or cellular signals are not available but other signals are. Furthermore, unnecessary alerting to a user of a monitoring device associated with the tracking device can also be avoided. Therefore, the tracking device's power is conserved, transmission costs are reduced, and the user of the monitoring device is spared from unwanted notifications.

A method comprises accessing historical signal information received from a tracking device configured to scan for signals transmitted by local devices as the tracking device moves within a geographic area during each of a plurality of time intervals. A training dataset is generated based on the historical signal information and used to train a machine learning model configured to predict tracking device movement patterns. The machine learning model is applied to current signal information to detect a variance from one or more predefined routines associated with the tracking device. A notification is sent to a monitoring device associated with the tracking device in response to detecting the variance from the one or more predefined routines associated with the tracking device. A non-transitory computer-readable medium stores instructions for performing the method.

A system comprises a tracking device configured to scan for signals transmitted by local devices as the tracking device moves within a geographic area during a plurality of time intervals. The system also comprises a tracking server comprising a hardware processor and a non-transitory computer-readable storage medium storing executable instructions that, when executed by the hardware processor, cause the hardware processor to perform steps. The steps comprise accessing current signal information received from the tracking device as the tracking device moves within the geographic area and applying a machine learning model to the current signal information to detect a variance from a predefined routine. The machine learning model is configured to predict tracking device movement patterns. The tracking server sends a notification to a monitoring device associated with the tracking device in response to detecting the variance from the predefined routine.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Environment Overview

Figure 1:
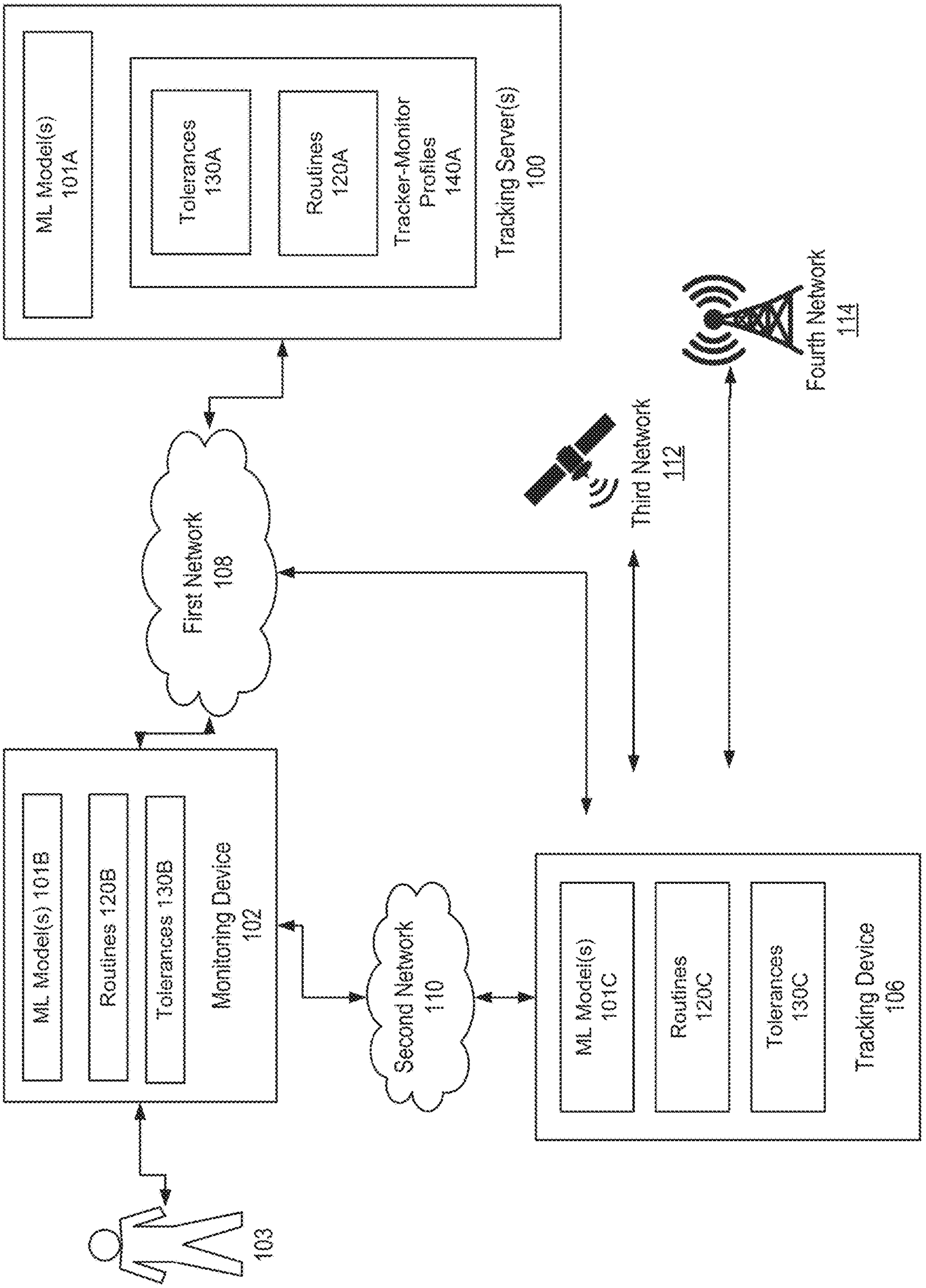
FIG. 1 illustrates an environment for efficient tracking, according to principles described herein.

FIG. 1 illustrates an environment for efficient tracking, according to one embodiment. FIG. 1 illustrates a tracking an environment or system, which as will be explained in more detail below, is configured for power-efficient tracking of a tracking device based on learned patterns and routines. The environment or system, as depicted in FIG. 1, includes a tracking device 106, a monitoring device 102, a user 103, one or more tracking server(s) 100 for providing features and services to each of the monitoring device 102 and tracking device 106, and a plurality of networks, including first network 108, second network 110, third network 112, and fourth network 114. Although FIG. 1 illustrates a particular arrangement of the tracking server(s) 100, the monitoring device 102, the user 103, tracking device 106, and the plurality of networks, various additional arrangements are possible.

First network 108, second network 110, third network 112, and fourth network 114 may each be a separate network from a plurality of networks, including, but not limited to, wireless networks (e.g., wireless communication networks), radio networks, mobile telephone networks (e.g., cellular telephone networks), closed communication networks, open communication networks, satellite networks, navigation networks, broadband networks, narrowband networks, the Internet, local area networks, and any other networks capable of carrying data and/or communications signals to and/or from the tracking device 106.

The tracking server(s) 100 and the monitoring device 102 communicate via the first network 108. The tracking server(s) 100 and the monitoring device 102 can communicate using any communication platforms and technologies suitable for transporting data and/or communication signals, including known communication technologies, devices, media, and protocols supportive of remote data communications. In one embodiment, the first network may be the internet.

The monitoring device 102 and the tracking device 106 communicate via the second network 110. The second network 110 can be a similar or a different type of network as any of the first network 108, third network 112, or fourth network 114. In some embodiments, the second network 110 includes a wireless network with a limited communication range, such as a Bluetooth or Bluetooth Low Energy (BLE) wireless network. In other configurations, the second network 110 is a mobile telephone network including one or more mobile devices (e.g., the monitoring device 102) and the tracking device 106). Accordingly, any given mobile device (such as the monitoring device 102) may be able to communicate with the tracking device 106 regardless of proximity. In some configurations, the monitoring device 102 can be associated with multiple tracking devices 106 associated with various users (e.g., the user 103). In embodiments, the monitoring device 102 enables the user 103 and/or the tracking server(s) 100 to communicate with the detected tracking device 106. In one embodiment, the strength of signals received by the monitoring device 102 from the tracking device 106 can be used to determine a distance between the monitoring device 102 and the tracking device 106.

Figure 7:
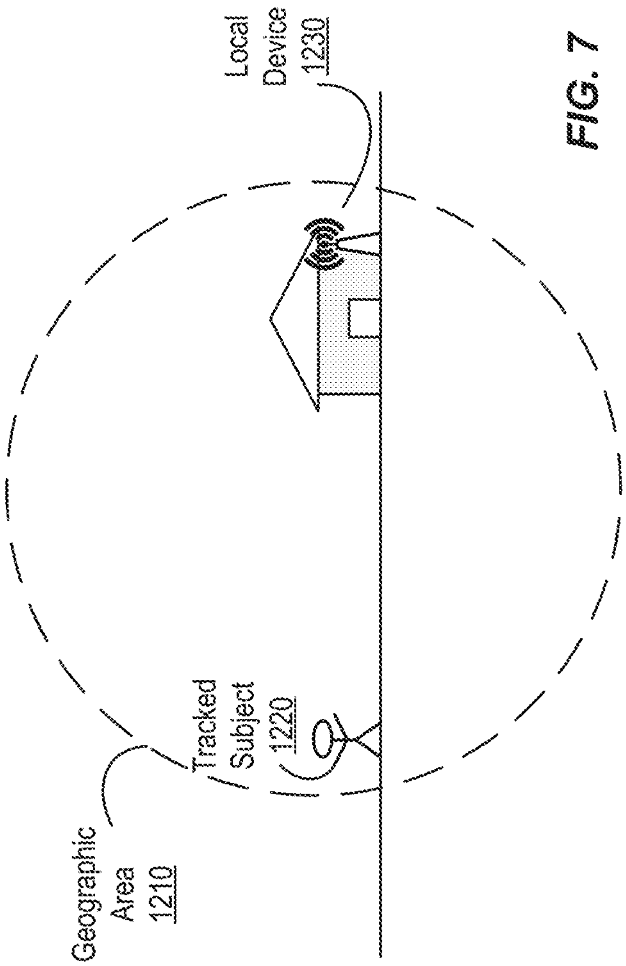
FIG. 7 illustrates an example of a use case for an environment for efficient tracking, according to one embodiment.

The tracking device 106 is configured to send and receive signals over the first network 108, second network 110, third network 112, fourth network 114, or some combination thereof. Furthermore, the tracking device 106 may be configured to scan for signals transmitted by local devices as the tracking device moves within a geographic area during each of a plurality of time intervals. As used herein, a "local device" may refer to a device that is within short to medium signal range of tracking device 106. For example, a local device may be a nearby wi-fi access point, Bluetooth-enabled device, local area network device, public beaconing system, proprietary signaling system, or other short to medium signal device that the tracking device 106 becomes physically near and capable of detecting signals from as the tracking device 106 (or tracked subject/object coupled thereto) moves along its path through a geographic area. As used herein, "a geographic area" may refer to an area in space defined by geography or other form of reference. For example, a geographic area may be defined by geographic coordinates, geographic locations, landmarks, zip codes, neighborhoods, subdivisions, school districts, municipal, city, state, or national boundaries, etc. An example of a geographic area according to one use case in an embodiment is shown and described with respect to the depiction and description of FIG. 7, provided further below.

The tracking device 106 can be a chip, tile, tag, mobile device (e.g., mobile phone, handset, etc.), or other device for housing circuitry and that can be attached to or enclosed within an object such as a wallet, keys, purse, car, pet, or other object or subject that the user 103 may track. The tracking device 106 includes a transmitter for transmitting/broadcasting signals (such as advertisement packets) that can be detected using a monitoring device 102 and received by the tracking server(s) 100, and a receiver for receiving communications (such as configuration instructions) from the monitoring device 102 and the tracking server(s) 100. For example, in one embodiment, the third network 112 may be a global positioning satellite (GNSS) network such as GPS for receiving and transmitting signals from the tracking device 106 to triangulate a location of the tracking device 106 in latitude/longitude coordinates. As another example, in various embodiments, the fourth network 114 may be a cellular, radio, optical, or other telecommunication network for communicating data from the tracking device 106 over long distances. In embodiments, the tracking device 106 can transmit/broadcast signals periodically or in response to an event (such as a detected location, motion, or other activity or change in state of the tracking device 106). In embodiments, the event may be a detected variance from a routine or variance in location of the tracking device relative to the monitoring device 102.

As previously mentioned, the tracking device 106 may transmit/broadcast signals such as, for example, data packets. The data packets include information that the monitoring device 102 can act on and/or that the monitoring device 102 can forward to the tracking server(s) 100 to act on. The tracking device 106 can define a format of the data packets including information included and order thereof. The tracking device 106 can inform the monitoring device 102 of the format of the data packets prior to transmitting/broadcasting the data packets. A data packet, such as an advertisement packet, from a tracking device 106 may include a unique tracking device identifier associated with the tracking device 106. The data packet may further include usage information associated with software/hardware components onboard the tracking device 106 such as, for example, one or more sensors, speakers, light emitting diodes (LEDs), displays, etc. The usage information associated with the components onboard the tracking device 106 can include, for example, current settings (e.g., high power or high efficiency notifications, a broadcast frequency of advertisement packets, etc.), power usage information and history, movement information and history, sensor use information and history, etc. The data packet includes battery information associated with a battery at the tracking device 106. The battery information includes, for example, a measure of battery capacity, a measure of remaining battery charge, a measure of discharge current, etc. The power usage information can include a measure of discharge current required to operate each of the one or more sensors, each of the speakers, each of the LEDs, each of the displays, etc. The power usage information can further include a measure of discharge current required for transmitting each data packet (e.g., for broadcasting each advertisement packet). In some configurations, the data packets may include a confirmation signal or confirmation information indicating the tracking device 106 successfully received messages, configuration parameters, instructions, and other data from the monitoring device 102, and embodiments can include a time or date since last reconfiguration/update. The data packet may further include a frequency or schedule of transmission of the data packets, which may include an indication of how often the tracking device 106 transmits one or more data packets. For example, packets may be transmitted in short time intervals, such as every 20 milliseconds to every 10.24 seconds, or in longer time intervals, including minutes, hours, days, or other fixed or varying set of time intervals or more complex schedule-based intervals. In some configurations, the tracking device 106 can adjust the set of time intervals or schedule. As used herein, a "schedule" may refer to time-based plan for carrying out one or more actions. For example, the actions may include one or more actions regularly carried out by any one of user 103, monitoring device 102, tracking device 106, a tracked object/subject associated with the racking device 106, tracking server(s) 100, or some combination thereof, and the time-based plan may include specific times or time intervals, including specified cadences of milliseconds, seconds, minutes, hours, days, weeks, or months for carrying out each of the actions.

In some embodiments, the tracking device 106 may store one or more machine learning (ML) model(s) 101C. The one or more ML model(s) 101C may include trained machine learning models. The ML model(s) 101C are configured and trained to predict tracking device movement patterns for detecting a variance from a routine based on current signals scanned by the tracking device 106 as it moves through a geographic area and encounters transient signals from local devices along its path as well as enduring signals along its path that attenuate and augment in approximate step with distance. In some embodiments, the ML model(s) 101C are configured and trained to predict co-movement between a tracking device 106 and monitoring device 102 for detecting a variance based on current movement information collected or sensed by the tracking device 106. Furthermore, the ML model(s) 101C may be stored as the same or similar machine learning models ML model(s) 101B, ML model(s) 101A, or some combination thereof. For example, in various embodiments, ML model(s) 101A, 101B, and 101C may each be a copy of an ML model stored at the tracking server(s) 100, monitoring device 102, and tracking device 106, or in other embodiments may only be stored on the tracking server(s) 100, monitoring device 102, or tracking device 106. As used herein, the ML model(s) 101, 101B, and 101C may individually and collectively be referred to as ML model 101.

In embodiments, the monitoring device may store ML model(s) 101B. In embodiments, the ML model(s) 101B be the same or similar ML model(s) as ML model(s) stored on the tracking device 106, and may therefore have the same or similar features and functionality. For example, the ML model(s) 101B may be trained to make the same or similar predictions based on current signal information and current movement information accessed from the tracking device 106. In additional embodiments, ML model(s) 101B may comprise a machine learning model for predicting a tolerance that will be accepted by the user 103. For example, when the tracking device is detected to deviate from a routine, an ML model of ML model(s) 101B may be used to predict if the deviation is within a tolerance where the monitoring device does not need to receive an alert. As used herein, a "tolerance" may refer to an allowable variation from expectations. For example, a tolerance may include tolerated movement patterns that do not trigger an alert or other tolerated variations in signal information or sensor information that differ from expectations or routines (e.g., having a slightly different signature, path, pattern, movement, or timing). The allowable variation from the routine (i.e., tolerance) before triggering alerts or further diagnostics or corrective action may be determined statistically during a learning phase or may be based on predefined ranges stored on the tracking device, tolerances explicitly approved by the user of the monitoring device, tolerances approved implicitly by frequent dismissal of alerts by the user of the monitoring device, or some combination thereof. When a machine learning algorithm predicts a movement pattern that varies from a predefined routine by a degree that is not tolerated, then a variance from the predefined routine is detected and a message may be generated and sent to a monitoring device 102, including alerts, notifications, or triggers to an output device, such as modifying a display of the monitoring device 102. As used herein, a "a variance," such as a "variation from a routine" or "variance from a predefined routine," may refer to an observation, measurement, or prediction that differs or deviates from expected results, such as a movement pattern that differs from a routine beyond a tolerance. The tolerances learned and predicted by the ML model 101 may further be stored by the tracking server(s) 100.

In some embodiments, updating of ML model 101 can be performed at the request of the user 103. For example, the monitoring device 102 receives input from the user 103 (e.g., via an application executing on the monitoring device 102 and/or an interactive graphical user interface displayed by the monitoring device 102 to the user 103), representative of information about the user 103, information about a tracking device 106, and/or parameters. In response, the monitoring device 102 transmits instructions and other data to the tracking device 106 via the second network 110. The monitoring device 102 can notify the user 103 that the parameters were successfully received by the tracking device 106 and can include a time since or date of last reconfiguration or update, for instance, in response to a data packet, including a confirmation signal received from the tracking device 106. Furthermore, the monitoring device 102 can notify the tracking server(s) 100 of the parameters the user 103 provided as input to the monitoring device 102 to transmit to the tracking device 106. The transmission can include information that the instructions, parameters, and other data were successfully received by the tracking device 106, and may further include a time since or date of last reconfiguration or update.

The monitoring device 102 can be configured to perform one or more functions with respect to communicating with the tracking device 106 and/or communicating with the tracking server(s) 100. The monitoring device 102 receives via the second network 110 advertisement packets from tracking devices 106 and notifications and alerts from the tracking server(s) 100 via the first network 108. In one example, the monitoring device 102 within a threshold proximity of the tracking device 106 can identify the tracking device 106 (e.g., using the unique tracking device identifier associated with and transmitted by the tracking device 106) based on information included in advertisement packets received from the tracking device 106 via the second network 110.

As previously mentioned, the monitoring device 102 transmits and receives information to and from the tracking server(s) 100 via the first network 108. In some embodiments, the monitoring device 102 can communicate with the tracking server(s) 100 and/or the tracking device 106 without bothering and without the involvement of the user 103, thereby improving the experience of the user 103. In embodiments, the experience of the user 103 may be improved by updating a tolerance for triggering a notification to the monitoring device. For example, in embodiments, the tracking server(s) 100 may conserve battery and reduce the number of notifications by limiting notifications to the user 103 to instances when the tracking device 102 has deviated from a predefined routine. In embodiments, the deviation may be detected using a machine learning model (e.g., ML model 101) configured to predict tracking device movement patterns from signal information. For example, a program managing an instance of the ML model 101 (e.g., at a tracking server 100 or on the tracking device 106 itself) may expect a routine of the tracking device 106 at a certain time and day, and the program may wait until measured signal information yields from the ML model 101 a tracking device movement pattern that has deviated or varied beyond a tolerated degree (e.g., beyond what user 103 has set as allowable). As used herein, a "tracking device movement pattern" may refer to physical movements or displacements of the tracking device in space, where the same or similar physical movements or displacements through space, within some tolerance, are likely to reoccur. For example, a tracking device movement pattern may include a specific path through a geographic area (e.g., a general path taken, within some tolerance, when traveling from home to school, such as paths along particular streets or other pathways taken).

The tracking server(s) 100 are configured to provide a number of features and services associated with the tracking devices 106 and monitoring device 102. For example, the tracking server(s) 100 can manage information and/or user profiles associated with the user 103 and the tracking devices 106. The tracking server(s) 100 is configured to receive, store, and process historical signal information, parameters, ML model 101, and/or information about the monitoring device 102, information about the user 103, and/or information about the tracking device 106 from the tracking device 106, monitoring device 102, other devices communicating with tracking server(s) 100, or some combination thereof.

The tracking server(s) 100 stores the association between the monitoring device 102 and the tracking device 106, along with (for example) a timestamp indicating the time that the monitoring device 102 received a location of the tracking device 106, a distance from the monitoring device 102 to the tracking device 106, a relative location between the monitoring device 102 and the tracking device 106, and the like.

In some configurations, the tracking server(s) 100 receives a notification (e.g., a confirmation) from the monitoring device 102 that the parameters and other information were successfully received by the tracking device 106 including a time since or date of last reconfiguration or update. In other configurations, the tracking server(s) 100 receives a notification (e.g., a confirmation) from the monitoring device 102 that the user 103 provided parameters as input to the monitoring device 102, such as a dismissal of a notification or other feedback for determining a tolerance accepted by the user 103 and/or monitoring device 102. In some configurations, the tracking server(s) 100 store instructions for initiating an action by the tracking device 106 or by the monitoring device 102, such as to emit audio from the speakers, to emit light from the LEDs, to display an indication on the display, or to display or emit any other type of notification (such as vibrations).

In embodiments, the tracking server(s) 100 are configured to access historical signal information received from the tracking device 106. The tracking server generates training datasets based on historical signal information accessed from the tracking device 106 and other tracking devices in communication with the tracking server(s) 100 (e.g., tracking devices 106 associated with other monitoring devices 102 and other users 103). The tracking server(s) may further be configured to train ML model(s) 101A using the generated training datasets. The ML model(s) 101A may include machine learning models configured to predict a tracking device movement pattern of the tracking device 106 within geographic areas where tracking device 106 and other tracking devices have moved around. The tracking server(s) 100 also access current signal information received from the tracking device as the tracking device 106 moves within the geographic area and apply the ML model(s) 101A to the current signal information to detect a variance from a predefined routine. The tracking server(s) 100 are further configured to send a notification to the monitoring device 102 associated with the tracking device 106 in response to detecting the variance from the predefined routine.

The tracking server(s) 100 may further be configured to store trained ML model(s) 101A on tracking device 106 and/or monitoring device 102 as ML model(s) 101C and 101B respectively, which can be updated by the tracking device 106, monitoring device 102, and/or user 103. Furthermore, tracking server(s) 100 may store tracker-monitor profiles 140A associated with user 103, tracking device 106, and associated monitoring device 102. The tracker-monitor profiles 140A for each tracking device 106 and associated monitoring device 102 in communication with the tracking server(s) 100 may comprise tolerances 130A and routines 120A associated with the tracking device 106, monitoring device 102, and user 103. Furthermore, in some embodiments, tolerances 130A may be stored locally on tracking device 106 and/or monitoring device 102 as tolerances 130C and 130B respectively. As used herein, the tolerances 130A, 130B, and 130C may individually and collectively be referred to as "tolerances 130." The tracking server(s) 100 may further store routines 120A as routines 120B and 120C on the monitoring device 102 and/or tracking device 106 respectively, which may be updated by the monitoring device 102, tracking device 106, and/or user 103. As used herein, routines 120A, 120B, and 120C may be individually and collectively referred to as "routines 120."

Tracking Servers

Figure 2:
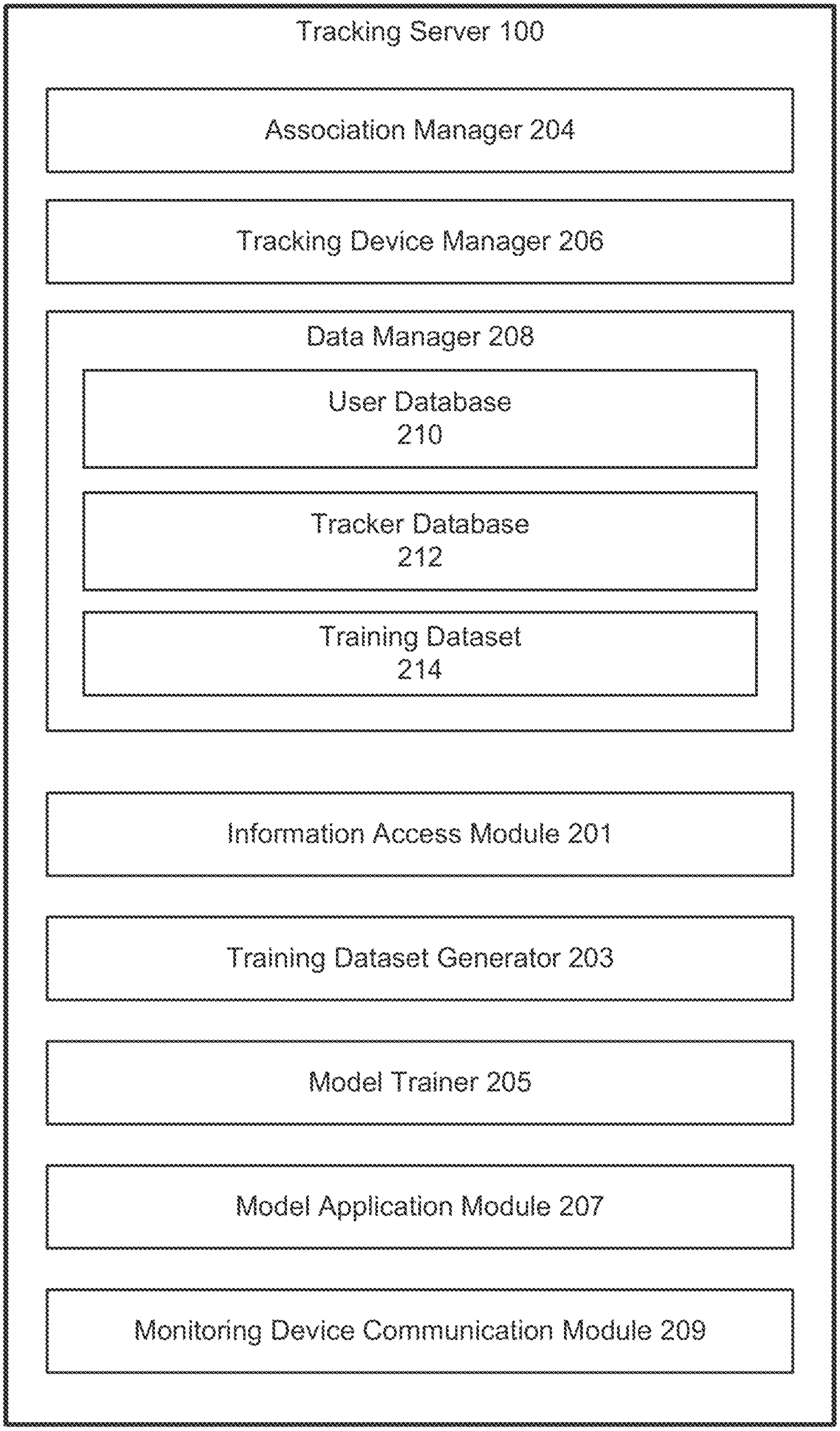
FIG. 2 illustrates a tracking server of the environment of FIG. 1, according to one embodiment.

FIG. 2 illustrates a diagram showing example components of the tracking server(s) 100, also referred to herein as "tracking server 100." The tracking server(s) 100 can be a server, such as a cloud server, a data center, a computer specially configured to perform the functionalities described herein, or any other suitable system. As shown, the tracking server(s) 100 includes, but is not limited to, an association manager 204, a tracking device manager 206, and a data manager 208 (herein collectively referred to as "managers 204-208"), each of which can communicate using any suitable communication technologies. It will be recognized that although managers 204-208 are shown to be separate in FIG. 2, any of the managers 204-208 can be combined into fewer managers, such as into a single manager, or divided into more managers as can serve a particular embodiment. Data manager 208 comprises user database 210, tracker database 212, and training dataset 214. The tracking server(s) 100 further comprises information access module 201, training dataset generator 203, model trainer 205, model application module 207, and monitoring device communication module 209. In some embodiments, training dataset generator 203, model trainer 205, and/or training dataset 214 may be implemented as, or stored on, another server or other computing device that may be a different and separate computing device from that of any of the tracking server(s) 100. For example, training and building a machine learning model, ML model 101, may be performed on a different computing device from which the ML model 101 is deployed.

The association manager 204 receives and processes information about specific tracking devices 106 associated with the monitoring device 102 and is configured to send and receive alerts, notifications, and other messages relating to the location of the tracking device 106. The association manager 204 stores the received information in a database (e.g., user database 210 and/or tracker database 212). The association manager 204 associates the tracking device 106 with the monitoring device 102. For example, the association manager 204 can store information about the tracking device 106, such as the unique tracking device identifier of the tracking device 106 in association with the unique monitoring device identifier for the monitoring devices 102 and/or user 103 it is associated with.

The tracking device manager 206 receives and processes information for the tracking device 106, updates ML model(s) 101C, determines parameters associated with the ML model(s) 101C, and transmits the updates and parameters to the tracking device 106 directly or via the monitoring device 102. As used herein, "parameters" associated with a machine learning model may refer to machine learning model parameters and model configurations, including configuration variables that are internal to the machine learning model and whose value can be estimated from given data (e.g., training data in a training dataset). For example, the machine learning model parameters may include labels, features, model weights (e.g., neural network weights), support vectors, and regression coefficients.

The data manager 208 stores and manages information associated with users, monitoring devices, tracking devices, other data of tracker-monitor profiles 140A, including tolerances 130A, routine 120A, other related data that can be stored and/or maintained in a database, or some combination thereof. As shown, the data manager 208 may include, but is not limited to, a user database 210, a tracker database 212, and a training dataset 214, which may each be one or more sources of data, including multiple data stores and datasets (e.g., multiple training datasets). It will be recognized that although databases and data within the data manager 208 are shown to be separate in FIG. 2, any of the user database 210, the tracker database 212, and the training dataset may be combined in a single database or manager or may be divided into more databases or managers as may serve a particular embodiment.

The user database 210 stores data related to various users. For example, the user database 210 can store the information from the user 103 and/or the information from the monitoring device 102. The information from the user 103 and/or the information from the monitoring device 102 can be associated with one or more respective tracking devices 106, or in one embodiment, can be stored without an association to a particular tracking device 106. For example, in some instances, the user 103 can provide information and permit performance of tracking functions on the monitoring device 102 without owning or being associated with the tracking device 106. The user database 210 can also include information about one or more monitoring devices 102 or other electronic devices associated with a particular user 103. Additionally, the user database 210 may include information about a user of a tracking device 106 associated with the monitoring device 102. For example, the user may be a tracked subject of the tracking device 106.

The tracker database 212 stores data related to tracking devices 106. For example, the tracker database 212 can store information from data packets received from the tracking devices 106, including historical signal information and historical movement information. The tracker database 212 can further include tracking data for any tracking device 106. Tracking data can include unique tracking device identifiers associated with individual tracking devices 106. The tracker database 212 can further include information about a tracked subject or a tracked object associated with the tracking device 106. For example, the tracker database 212 may include characteristics about the tracked object or tracked subject, such as types, profiles, preferences, names, activities, associations with other tracked objects, tracked subjects, and users, other characteristics, other historical information, or some combination thereof. Furthermore, the tracker database 212 may further comprise grouping of tracking device 106 into tracking device cohorts. As used herein, a "tracking device cohort" may refer to groups of tracking devices 106 that have the same or similar characteristics, such as being of the same or similar geographic location, involved in the same or similar activities, being associated with the same or similar monitoring devices 102 or users 103, including monitoring devices 102 and users 103 that have the same or similar characteristics as one another, including being of the same or similar geographic location or involved in the same or similar activities. In embodiments, the tracking device cohorts may include geography-based tracking device cohorts and activity-based tracking device cohorts.

The geography-based tracking device cohorts may include groups of tracking devices 106 that are of the same geographic area or location, and of geographic areas or locations having similar characteristics. For example, geography-based tracking device cohorts may include cohorts for "New York," "San Francisco," "California," "Asia," "North America," "X county", "X school district," and so on. Similarly, the geography-based tracking device cohorts having similar characteristics, such as population density, culture, and activities performed by its population. For example, the geography-based tracking device cohorts may include cohorts for "city," "rural," "population over 1 million," "population under 1000," "high traffic levels," "heavy car usage," "heavy public transit usage," and so on.

The activity-based tracking device cohorts may include groups of tracking devices 106 and tracked subjects/objects thereof, that engage in the same activities, have the same or similar characteristics, are associated with the same monitoring device 102 or user 103, or that are in some way linked together (e.g., paired together by a user 103). For example, the activity-based tracking device cohorts may include cohorts for "children ages 5-12," "teens," "seniors," "medical patients," "special needs," "engaged in sports," "engaged in music," "likes to read," "likes to run," "likes to bike," "introverted," "extraverted," etc. In other examples, the activity-based tracking device cohorts may include, "pets," "dogs," "cats," "kittens," "puppies," "dogs of breed X," "dogs of breed Y," "phone," "keys," "wallet," etc. In some embodiments, the activity-based tracking device cohorts may be based on user profile data (e.g., data of tracker-monitor profiles 140A, user database 210, and/or tracker database 212) and data linking tracking devices 106 together including family groups, friend groups, school groups, team groups, etc. For example, the activity-based tracking device cohorts may include, "baseball team X," "football team Y," "dance team Z," "family a," "extended family b" "kids of neighborhood c," etc.

Furthermore, in embodiments, the tracker database 212 and/or the user database 210 can include information describing permissions and permission levels associated with a particular user 103 and/or tracking device 106. For example, the tracker database 212 and/or the user database 210 can identify additional users 103 with shared permissions (such as access permissions, communication permissions, and the like) for a tracking device 106.

Information access module 201 accessing information from the tracking devices 106, including historical and current signal information and current and historical movement information. Information access module 201 may access the information directly from the tracking device 106 or may retrieve the information from a database (e.g., of data manger 208), one or more monitoring devices 102, one or more other server(s) 100, some other store of data where the tracking device 106 may store the historical or current information, or some combination thereof.

Training dataset generator 203 generates training datasets 214 using the information accessed by information access module 201. Training dataset generator 203 compiles data from the information accessed by information access module 201 into training datasets that can be used to train a corresponding machine learning model. In one embodiment, generating the training dataset by the training dataset generator 203 may further include augmenting the data samples to include fewer or additional data in the training dataset or to modify the training data contained therein. For example, data augmentation techniques, including generating synthetic data, adding noise or other additions/removal of information in training data, performing transformations to training data, other data augmentation techniques, or some combination thereof, may be implemented by the training dataset generator 203. Furthermore, in embodiments, training dataset generator 203 may be configured to segment the training dataset 214 into training datasets associated with specific tracking device cohorts. For example, training dataset 214 may comprise historical signal information from all tracking devices 106, while training dataset generator 203 may generate segments of historical signal information within training dataset 214 based on tracking device cohort. In this way, there may be several different ML models 101 that are each trained on data specific to a particular tracking device cohort.

Model trainer 205 trains machine learning models, ML model(s) 101A, 101B, and 101C, using the training datasets 214 generated by training dataset generator 203. In one embodiment, the training datasets may include mappings between historical signal information that may serve as model inputs and a set of tracking device movement patterns (e.g., labels or groups) which serve as model outputs. The model trainer 205 is configured to train the ML model(s) 101A to predict a tracking device movement pattern based on the historical signal information by, for example, determining weights or coefficients of predictive features of the historical signal information that reduce a loss or error function, or using some other form of learning algorithm. For example, and the historical signal information may include elements of data (e.g., timestamp, date, day of the week, month, frequency, bandwidth, unique identifier, network type, signal strength, ping, network name, recurrence, etc.) which may be grouped and predetermined as signatures in historical signal information that are indicative of a particular tracking device movement pattern (e.g., a tracking device 106 moving from a home location to a school location or from one location in a neighborhood to another, a tracked subject going to music lessons, a tracked subject being lost, a tracked subject running, a tracked subject in distress, etc.). These signatures may be configured as predictive features that the model trainer 205 weighs to control their impact on the predicted output of the ML model 101. In some embodiments, the tracking device movement patterns in the training dataset 214 may have predefined labels and model trainer may use a supervising learning algorithm to build/train the ML model 101. In some embodiments, the tracking device movement patterns may be unlabeled and model trainer 205 may use an unsupervised learning algorithm to train the model. In some embodiments, model trainer 205 may use a semi-supervised learning algorithm. In one embodiment, a user 103 of the monitoring device 106 may determine the labels for the training dataset 214. For example, tracking server 100 may recognize similarities in historical signal information across multiple tracking devices 106 or across a single tracking device 106 but repeating regularly over time that are indicative of a potential/candidate tracking device movement pattern and may send an alert, notification, request, or other message to the associated monitoring devices 106 notifying or suggesting for the users 103 to name/label the tracking device movement pattern (e.g., "going to the movies," "going to the football game," "going to the dance," "going to X event," "following Y routine," "performing Z activity," etc.). In some embodiments, the message may include a time, date, location, number of detected occurrences, number of devices involved in, confidence level, an initial tolerance, some other characteristic associated with the tracking device movement pattern, or some combination thereof.

Model application module 207 applies the machine learning models trained by the model trainer 205 to current information to make a prediction. In one embodiment, applying the machine learning model to current information may include applying one or more machine learning models to current signal information to detect a variance from one or more predefined routines associated with the tracking device 106, routines 120. For example, from features in the current signal information scanned by the tracking device 102 when crossing local devices within signal range of its path, a tracking device movement pattern is obtained as output prediction from ML model 101. As one example, the tracking device movement pattern may be a straight path down a row of houses in a neighborhood (e.g., scanning several wi-fi access points in successions) that may be indicative of a walk from a bus stop to a tracked subject's home. As another example, the tracking device movement pattern may be a random path through a crowd of local devices (e.g., picking up several Bluetooth signals in an irregular manner), which may be indicative of a tracked subject being lost in a crowd. If the track device movement pattern varies beyond a tolerance from a routine, then a variance is detected. For example, if the tracking device movement pattern is too far behind or too ahead of schedule, occurs on the wrong time of day or day of the week, is too irregular of a path (e.g., is a zigzag, random, or other inconsistent movement pattern), then the variance from the routine may be detected. In another embodiment, applying the machine learning model to current information may include applying the machine learning model to current movement information to detect a variance in a location of the tracking device 106 relative to the monitoring device 102. For example, from features in the current movement information, an indication of co-movement between tracking device 106 and monitoring device may be obtained as output. If co-movement is predicted, and then shortly after, a lack of co-movement is predicted, then a variance in location of the tracking device 106 relative to the monitoring device 102 is detected. For example, features such as moving at the same speed or cadence may indicate co-movement (e.g., tracking device 106 and monitoring device 102 moving in the same vehicle), and features such as differing speed and cadence (e.g., pedometers on each device measuring a differing walking pace) may indicated a lack of co-movement, thereby indicate that the tracking device 106 is no longer moving with the monitoring device 102, and a tracked subject/object may be identified as lost.

Monitoring device communication module 209 sends notifications and other communications to a monitoring device 102 associated with a tracking device 106. In one embodiment, monitoring device communication module 209 sends a notification in response to detecting the variance from the predefined routine, as performed/detected by the model application module 207. For example, the notification may include a notice of the detection and information relating to the detection, such as the degree and nature of the variance. As some illustrative examples, the notification may indicate how far ahead or how far behind schedule the movement was from the expected routine, how varied or inconsistent the tracking device's movement pattern is, how far deviated the predicted path was from the expected path or routine, how often a variance from the routine has been detected in the last week, month, or year, how many times the detected variance has been tolerated/dismissed by the user 103 or how many times a similar variance has been tolerated/dismissed by other users 103 of other monitoring devices 106, other information relating to the detected variance, the predicted movement pattern, the routine, or some combination thereof. Additionally, a selection for the user 103 of the monitoring device 106 to take action based on the detected variance or dismiss the alert, may also be provided. In some embodiments, the monitoring device communication module 209 may use this information to retrain a machine-learned model to better align predicted movement with the detected variance from the predefined routine. Likewise, in another embodiment, monitoring device communication module 209 sends a communication for modifying a display of the monitoring device 102 to include the location of the tracking device 106 relative to the monitoring device 102. For example, the communication may include a visual display of the location of the tracking device 106 or the path that was taken by the tracking device 106.

Figure 3:
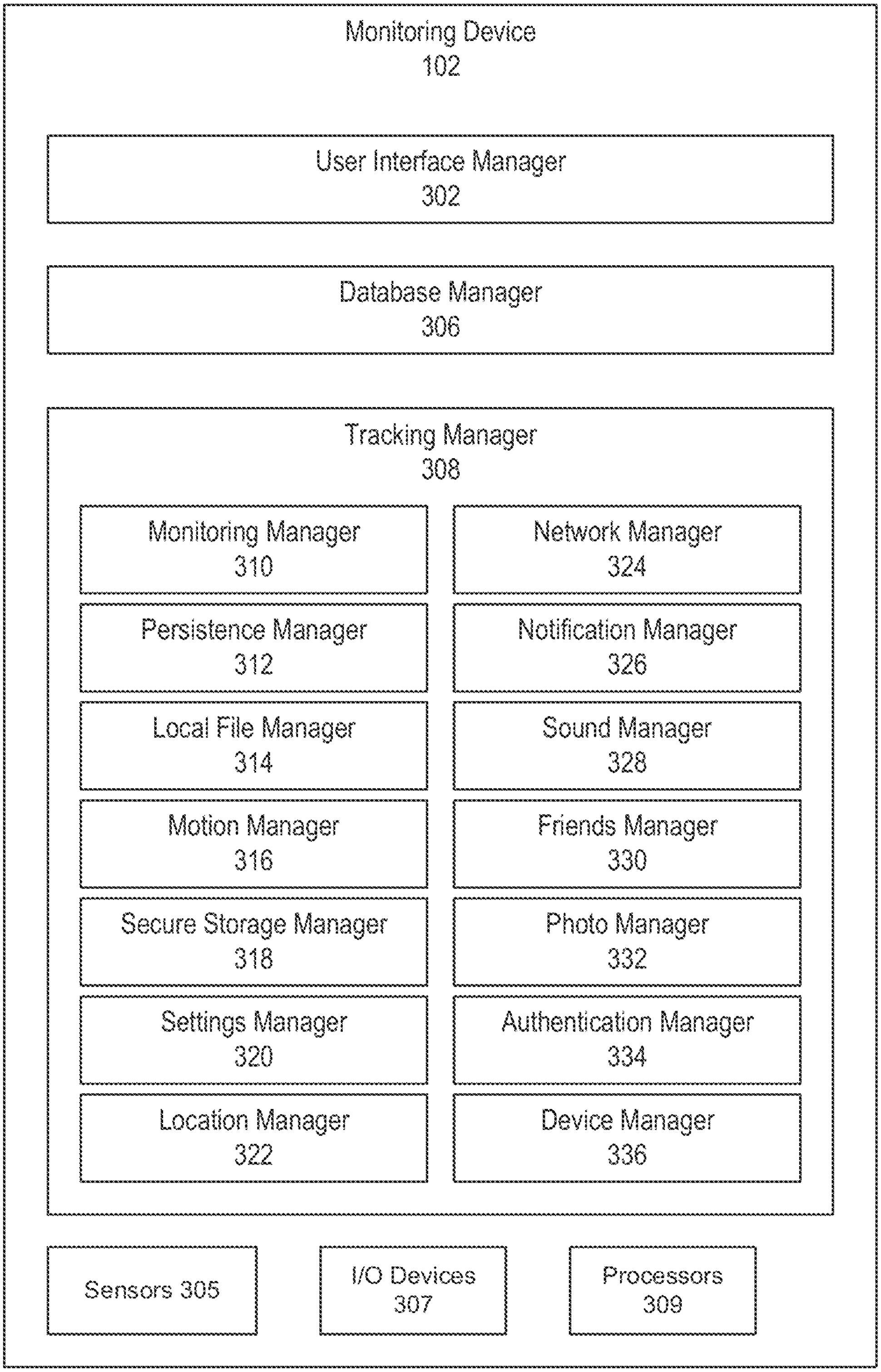
FIG. 3 illustrates a monitoring device of the environment of FIG. 1, according to one embodiment.

FIG. 3 illustrates a diagram showing example components of the monitoring device 102. The monitoring device may be implemented as any of a mobile device (e.g., smartphone), wearable device, internet-of-things (IOT) device, laptop, computer, or other similar computing device. As shown, the monitoring device 102 includes sensors 305 for taking measurements relative to the physical environment of the monitoring device 102, input/output (I/O) devices 307 for receiving inputs to and providing outputs from the monitoring device 102, and one or more processors 309 for executing instructions stored in a non-transitory computer-readable medium of the monitoring device 102 (e.g., from memory). The monitoring device 102 may include, but is not limited to, a user interface manager 302, a database manager 306, and a tracking manager 308, each of which may be in communication using any suitable communication technologies. It will be recognized that although managers 302, 304, and 308 are shown to be separate in FIG. 3, any of said managers may be combined into fewer managers, such as into a single manager, or divided into more managers as may serve a particular embodiment.

The user interface manager 302 facilitates the user 103 in providing data to and access to data on the tracking server(s) 100 and/or tracking device 106. Further, the user interface manager 302 provides a user interface by which the user 103 can communicate with tracking server(s) 100 and/or tracking device 106 via monitoring device 102. The user interface manager 302 can receive alerts, notifications, and other data messages for providing information through displays or other output devices of the monitoring device 102. In embodiments, this may include a notification received in response to a variance detected by the tracking server(s) 100. In further embodiments, this may include a message for modifying a display of the monitoring device 102 to include a location of the tracking device 106 relative to the monitoring device 102.

The database manager 306 maintains data related to the user 103, the tracking device 106, or other data that can be used for communicating with a tracking device 106. Further, the database manager 306 maintains any information that can be accessed using any other manager on the monitoring device 102.

The tracking manager 308 includes a tracking application (e.g., a software application) for communicating with the tracking device 106 associated with the user 103. For example, the tracking manager 308 can be one configuration or instance of a tracking application installed on the monitoring device 102 that provides the functionality for communicating with the tracking device 106. As shown, the tracking manager 308 can include, but is not limited to, a monitoring manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The monitoring manager 310 can be used to manage communication with one or more tracking devices 106 and the tracking thereof. In embodiments, the monitoring manager 310 may comprise instructions for identifying routines 120 associated with the tracking device 106. Furthermore, the monitoring manager 310 may comprise instructions for processing inputs relating to tolerances 130 associated with monitoring of the tracking device 106 (e.g., tolerances deemed acceptable by the user 103 of the monitoring device 102).

The persistence manager 312 can be used to store logical schema information that is relevant to the tracking manager 308. The local files manager 314 can be responsible for managing all files that are input or output from the monitoring device 102. The motion manager 316 can be responsible for all motion management required by the tracking manager 308, such as management of measurements and data taken from accelerometers, pedometers, gyroscopes, and other sensors. The secure storage manager 318 can be responsible for storage of secure data, including information such as passwords and private data that would be accessed through this sub-system. The settings manager 320 can be responsible for managing settings used by the tracking manager 308. Such settings can be user controlled (e.g., user settings) or defined by the tracking manager 308 for internal use (e.g., application settings) by a monitoring device 102 and/or the tracking server(s) 100. The location manager 322 can be responsible for location tracking of the monitoring device by the tracking manager 308. For example, the location manager 322 can manage access to location services of the monitoring device 102, to tracking server(s) 100, and can work in conjunction with other managers to persist data.

The network manager 324 may be responsible for networking communications from the tracking manager 308, including communications over first network 108 (e.g., the internet). For example, the network manager 324 can mediate all Internet API calls for the tracking manager 308. The notification manager 326 can be responsible for managing local and push notifications required by the tracking manager 308. The sound manager 328 can be responsible for playback of audio cues by the tracking manager 308. The friends manager 330 can be responsible for managing access to contacts and the user's social graph. The photo manager 332 can be responsible for capturing and managing photos used by the tracking manager 308. The authentication manager 334 can be responsible for handling the authentication (e.g., sign in or login) of users. The authentication manager 334 can also include registration (e.g., sign up) functionality. The authentication manager 334 can further coordinate with other managers to achieve registration functionality. The device manager 336 can be responsible for managing the devices discovered by the tracking manager 308. The device manager 336 can further store and/or maintain the logic for algorithms related to device discovery and update.

Routines

Figure 4:
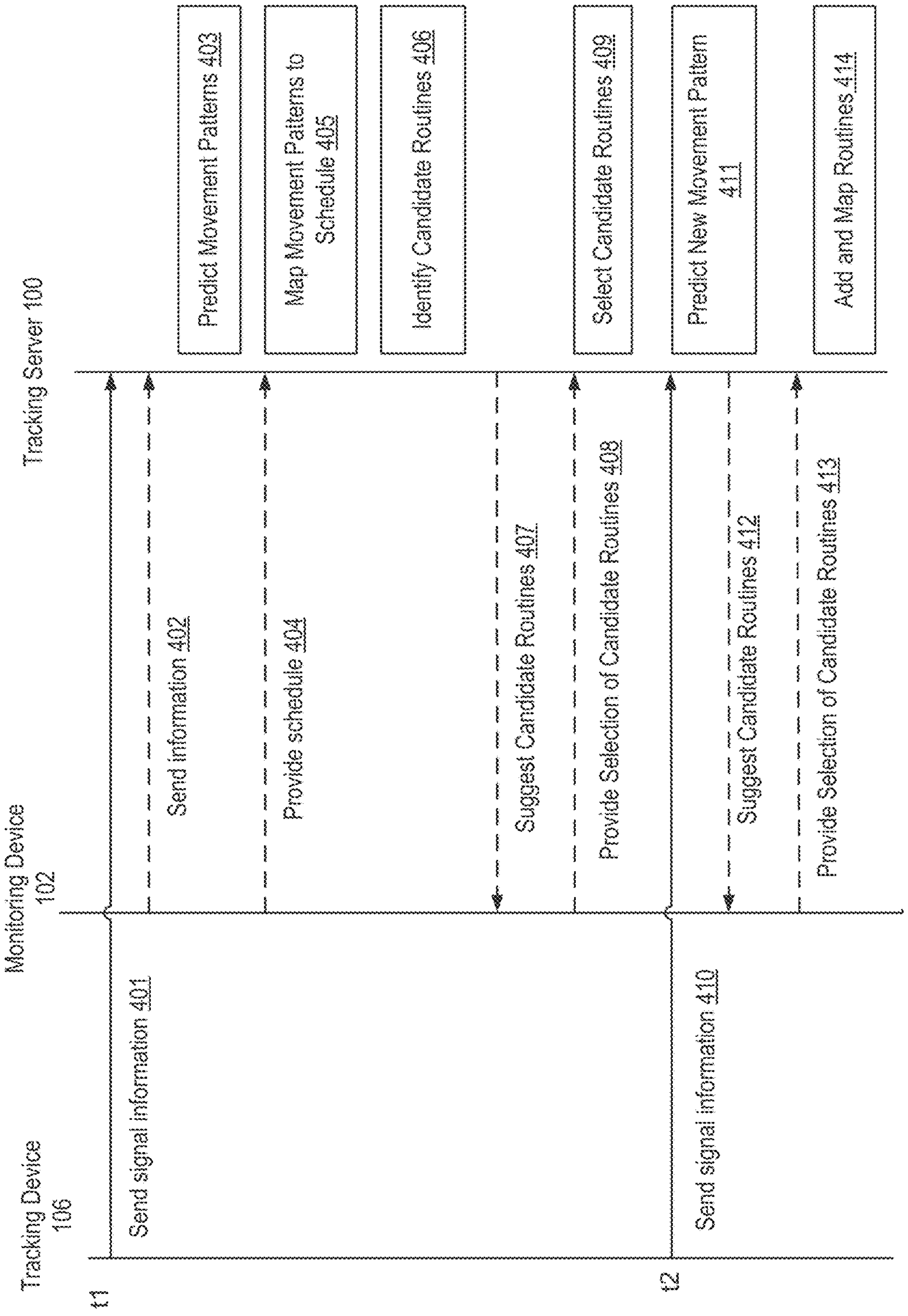
FIG. 4 illustrates an interaction diagram for associating routines with a tracking device, according to one embodiment.

FIG. 4 illustrates an interaction diagram for associating routines with a tracking device, according to one embodiment. The steps 401 through 414 may be implemented as shown in FIG. 4 as instructions stored on a non-transitory computer-readable medium that may be executed by corresponding processors of the tracking device 106, monitoring device 102, and tracking server 100, and cause the corresponding processors to execute the steps when executed.

At step 401, the signal information is sent from the tracking device 106 at an initial period of time t1 and is received by the tracking server 100. The signal information includes signals scanned from local devices as the tracking device 106 moves through a geographic area, such as when a tracked subject/object travels across roads, walkways, bike ways, city streets, etc., moves around a building, or performs some other movement through physical space. The signal information may be a subset of the historical signal information that is used by model trainer 205 to train ML model 101. For example, the time t1 may include a subset of the complete set of time intervals from training dataset 214.

At step 402, optionally, the monitoring device 102 also sends information to the tracking server 100, which the tracking server 100 receives. For example, the monitoring device 102 may provide information that helps the tracking server 100 narrow the possible set of predicted outcomes made by the ML model 101, including characteristics of the tracked subject/object (e.g., behavioral characteristics and tendencies).

At step 403, tracking server 100 predicts tracking device movement patterns associated with the tracking device 106. The tracking server 100 applies ML model 101 to the signal information received over t1 to predict one or more tracking device movement patterns associated with the tracking device.

At step 404, optionally, the monitoring device 102 provides a schedule to the tracking server 100. For example, the schedule may include times of day, days of the week, dates in a month/year, etc., when certain activities or routines are expected of the tracking device 106. In some embodiments, the tracking server 100 may already store a predefined schedule of the tracking device 106. In other embodiments, the tracking server 100 may use a default schedule for the tracking device 106 or a tracking device cohort of the tracking device 106.

At step 405, the tracking server 100 maps the predicted tracking device movement patterns from step 403 to the schedule for the tracking device 106 and/or the tracking device cohorts. For example, the predicted tracking device movement pattern may be a path from the tracked subject's school to home, and the tracking device may map the tracking device movement pattern to a "walk home" event on the schedule, which may occur every Monday through Friday, from 3 PM to 4 PM, on specific weeks of the year. In one embodiment, additional data sources may be used to map the tracking device movement pattern to the schedule for the tracking device 106, its tracking device cohort, or some combination thereof. For example, a school academic calendar may be used to identify holidays or weeks in the year when the "walk home" movement pattern should not be mapped. As another example, a calendar of the user 103 of the monitoring device 102 may be used to similarly identify days when the "walk home" movement pattern should not be mapped (e.g., "Date: MM/DD/YYYY, pick up tracked subject from school and drive to music lessons).

At step 406, the tracking server 100 identifies one or more candidate routines based on the mapping of the predicted tracking device movement patterns to the schedule. For example, the tracked subject's movement pattern when walking home from school may be set as a routine that occurs every Monday through Friday, from 3 PM to 4 PM, on specific weeks of the year, excluding certain dates. As such, during the specified time periods, on the specified dates, signal information from the tracking device 106 may be applied to the ML model 101 to detect if the routine is followed or if there is a variance. In some embodiments, the variance is detected only if it is greater than a tolerance. For example, if the expected tracking device movement pattern occurs slightly earlier or slightly later than as outlined by the routine, then the variance may be tolerated without detection. As another example, if the predicted tracking device movement pattern is not a gross deviation from the expected tracking device movement pattern (e.g., is below the user-defined tolerance set at the monitoring device 102), then the variance may be tolerated without detection.

At step 407, optionally, the tracking server 100 suggests the candidate routines to the monitoring device 102 for selection. For example, before establishing the candidate routine as associated with the tracking device 106, the tracking server may send a message to the monitoring device 102 asking the user 103 if the candidate should be added. As such, the user 103 may indicate, and communicate through the monitoring device 102, whether a predicted movement pattern adheres to a schedule for the tracked subject and should be expected as part of a routine associated with the tracking device 106.

At step 408, optionally, the monitoring device 102 provides a selection of candidate routines, such as selections chosen from the suggestions from step 407, such as providing the selection in a message to the tracking server 100. For example, the message may indicate which of the candidate routines should be associated with the tracking device 106 and that the ML model 101 should be used to detect a variance from.

At step 409, the tracking server 100 selects one or more of the candidate routines as predefined routines associated with the tracking device 102. For example, the selections may be based on the message provided by the monitoring device 102 from step 408. The associations may be made in a database, such as indicated in relational tables, graphs, or other forms of mapping.

At step 410, and at a later period of time, t2, the tracking device 106 sends new/current signal information to the tracking server 100, which is received by the tracking server 100. For example, the tracking device 106 may travel the same or different paths through the geographic area as before, over a period of hours, days, weeks, months, etc., and on various days and at various times. As the tracking device 106 moves through the geographic area, it scans local devices and records current signal information from the local devices. The recorded signal information is then sent to the tracking server 100 and received.

At step 411, the tracking server 100 predicts a new tracking device movement pattern and identifies a new tracking device movement pattern as relating to an unmapped routine. For example, the tracking server 100 may determine that ML model 101 has predicted a recurring movement pattern that is not mapped to any predefined routine associated with the tracking device 102. As one example, the recurring movement pattern may be indicative of a slightly different path or motion pattern traveled from a home location to a school location, which has been detected/predicted by the ML model 101 on multiple occasions but has not been mapped by the tracking server 100 or defined by the user 103.

At step 412, optionally, the tracking server 100 suggests to the monitoring device 102 that the new tracking device movement pattern is an unmapped routine of the tracking device 106. For example, the tracking server 100 may send a message to the monitoring device 102 communicating information for the new tracking device movement pattern, such as a display of the predicted movement/path through the geographic area, how many times the predicted movement has been detected, a suggested name for the unmapped routine (e.g., "shortcut home"), other relevant information that may be displayed on the monitoring device 102, or some combination thereof.

At step 413, optionally, the monitoring device 102 provides a selection of the new tracking device movement pattern as an unmapped routine of the tracking device, which is received as a selection to add the unmapped routine to the predefined routines associated with the tracking device 106. For example, the user 103 may input to the monitoring device 102 a selection to include/map the new tracking device movement pattern to one of the predefined routines for the tracking device 106 (as an accepted alternate routine or optionally replacing the existing pre-defined routine), to add/define a new routine for the new tracking device movement pattern, or the user 103 may provide an input to the monitoring device 102 to dismiss the suggestion (e.g., the user 103 still wants to be notified when the slightly different path home is taken).

At step 414, the tracking server 100 adds the unmapped routine to the predefined routines associated with the tracking device 106 and maps the unmapped routine to the new tracking device movement pattern. As such, when the new tracking device movement pattern is subsequently output by the ML model at a later point in time, then the monitoring device 102 may not be notified if it is in accordance with the routine (e.g., occurs on the expected times, days, and dates).

Figure 5:
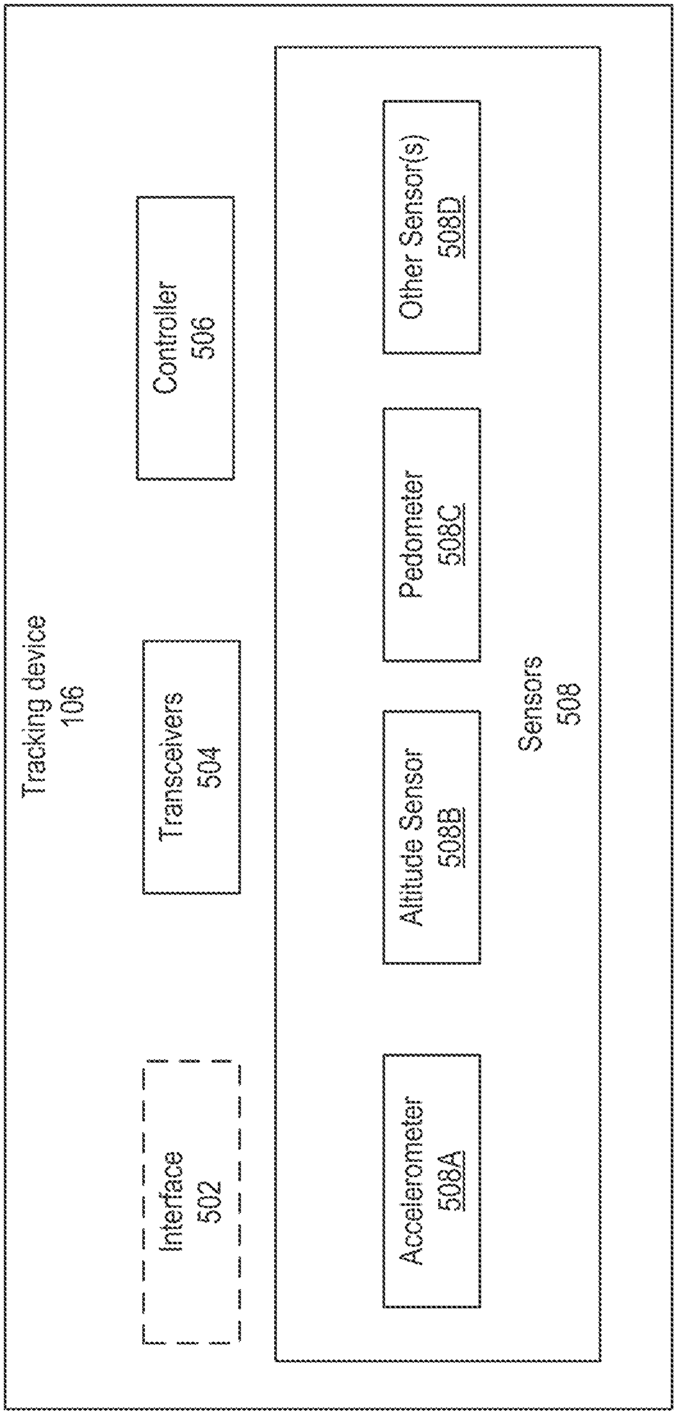
FIG. 5 illustrates a tracking device of the environment of FIG. 1, according to one embodiment.

FIG. 5 illustrates a tracking device of the environment of FIG. 1, according to one embodiment. The tracking device 106, as illustrated, comprises transceivers 504, controller 506, and one or more sensors 508. Optionally, the tracking device 106 comprises an interface 502, which may include any number of input/output devices, including microphones, speakers, displays/touchscreens, buttons, touchpads, other input/output device, or some combination thereof. Transceivers 504 send and receive signals, including signals scanned from local devices and signals transmitted and received to and from location services (e.g., GPS) or other services, networks (e.g., first network 108, second network 110, third network 112, fourth network 114), and computing devices. Controller 506 includes one or more processors and non-transitory computer-readable mediums (e.g., memory stores). The one or more sensors 508 may include accelerometers 508 for measuring acceleration and determining an orientation of the tracking device, altitude sensor 508 for measuring an altitude of the tracking device 106 (e.g., an altitude or barometer), pedometer 508C for measuring steps and/or walking cadence of the tracking device 106 or its tracked subject (e.g., user wearing the tracking device 106), and one or more other sensors 508D.

Figure 6:
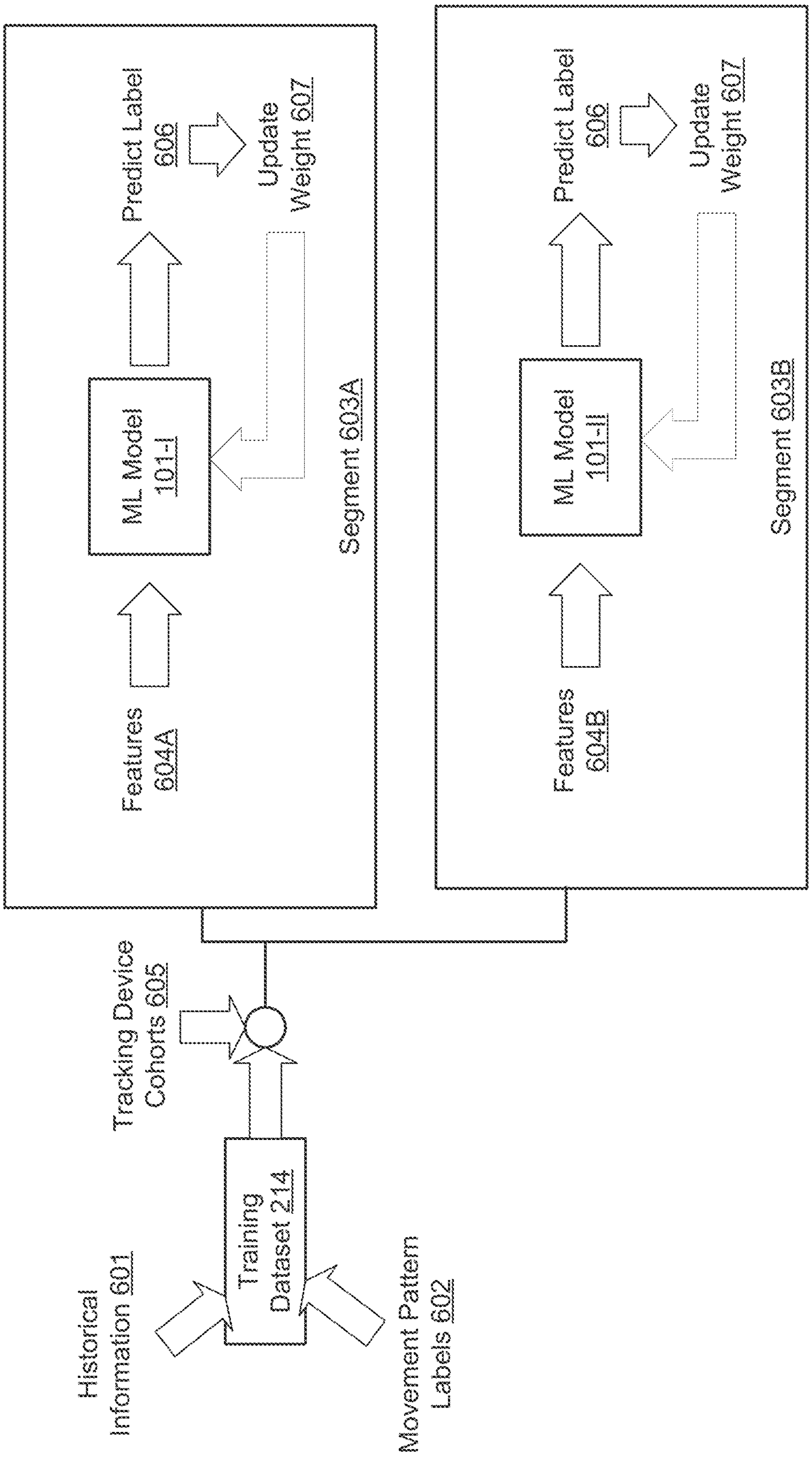
FIG. 6 illustrates training of a machine learning model, according to one embodiment.

FIG. 6 illustrates training of a machine learning model, according to one embodiment. The training process 600 may be implemented as executable instructions stored on a computer-readable medium which cause a processor of a computing device to perform the training process 600. Historical information 601 is obtained, and, using the historical information 601 and movement pattern labels 602, a training dataset 214 is generated. Tracking device cohorts 605 are used to group subsets of the training dataset 214 into segments, including segment 603A and segment 603B. Elements of training data for segment 603A and 603B are grouped into features 604A and 604B respectively. Features 604A and 604B, referred to individually and collectively as "predictive features", are used to train ML model 101-I and ML model 101-II respectively. For each of ML model 101-I and ML model 101-II (individually and collectively referred to as ML model 101), training examples of segment 603A and 603B are provided respectively. When the predictive features are detected in the training examples, the ML model 101 is trained to predict a label 606. Weights associated with the predictive features are updated 607 to reduce a loss function, which measures the error between the predicted label 606 and a ground truth obtained from the movement pattern labels 602 in the training dataset 214. The updated weights are configured as the parameters of the trained ML model 101. As such, the training process 600 produces associations that are learned by the ML model 101, which accordingly predicts the movement pattern labels 602 when relevant features 604A and 604B are detected in new data that the ML model 101 is applied to during deployment (e.g., when running on the tracking device 106 or tracking server 100 in communication with the tracking device 106 as it moves through the geographic area).

FIG. 7 illustrates an example of a use case for an environment for efficient tracking, according to one embodiment. A tracked subject 1220 wears or carries the tracking device 106. Local device 1230 is encountered within signal range as the tracked subject walks through a geographic area 1210. The signals scanned from the local device 1230 and other local devices along the tracked subject's path are recorded as historical signal information to train ML model 101 to predict the tracking device movement patterns of the tracking device 106 and/or the tracking device cohorts relating to the tracking device 106. The tracking device movement patterns are mapped as routines that regularly occur according to a schedule. When the tracked subject 1220 follows the same or similar path, the signals scanned from the local device 1230 and other local devices along the tracked subject's path are applied as current signal information to the trained ML model 101 to predict the tracking device movement pattern. If the prediction does not vary beyond a tolerance from the routine, then the tracking device 106 may refrain from transmitting signals to location services or other alert and messaging services. If the variance is greater than the tolerance, then a call to location services is made and a notification to a monitoring device 102 associated with the tracking device is transmitted.

Figure 8:
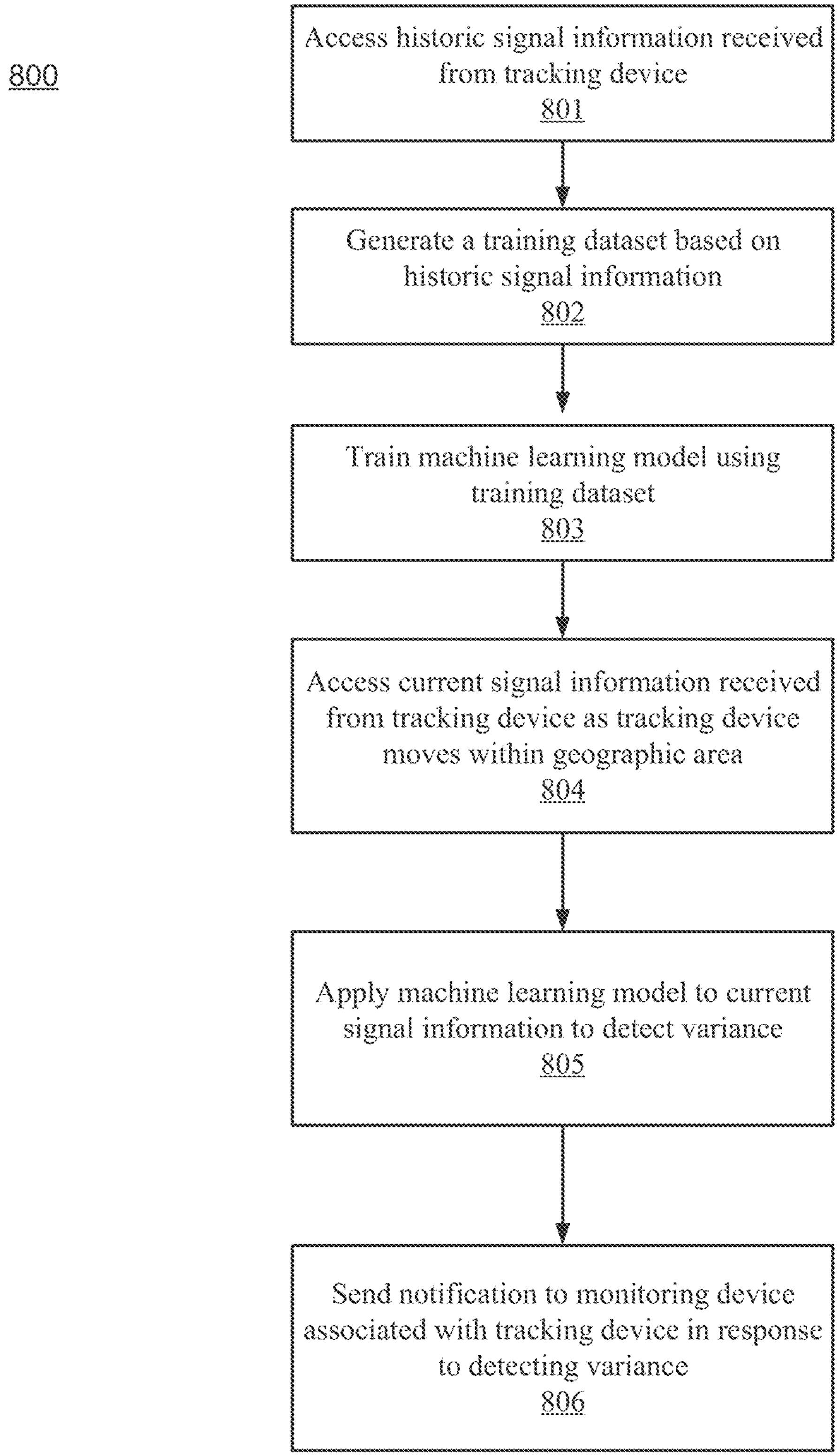
FIG. 8 illustrates a method for efficient tracking using machine-learned patterns and routines, according to one embodiment.

FIG. 8 illustrates a method for efficient tracking using machine-learned patterns and routines, according to one embodiment. The method 800 may be stored as instructions or code stored on a computer-readable medium (e.g., a memory or other computer storage device) and executed by one or more processors of one or more computing devices, and may cause the one or more processors to perform the method 800 when executed. The computing device may include any one of tracking server 100, monitoring device 102, tracking device 106, or some combination thereof.

The processor accesses 801 historical signal information received from at least one tracking device configured to scan for signals transmitted by local devices as the tracking device moves within a geographic area during each of a plurality of time intervals. For example, a tracking server 100 may use an information access module 201 to retrieve historical signal information from a database where signal information collected from tracking devices 106 over time are stored.

The processor generates 802 a training dataset based on the historical signal information. For example, the tracking server 100 may use training dataset generator 203 to generate a plurality of training datasets from the historical signal information, which may each be associated with a tracking device cohort, such as a geography-based cohort or activity-based cohort. The tracking server 100 may generate training datasets relevant to each tracking device cohort, so that the trained ML model may be trained on data representative of data that the tracking devices 106 in an associated cohort will likely encounter during deployment of the ML model. In one embodiment, the tracking device cohorts may be determined by applying a clustering algorithm to the historical signal information, such as k-means clustering or the like. For example, clustering may be used to segment the historical signal information into the relevant cohorts based on similarities between the tracking devices 106 and the historical signal information received from the tracking devices 106.

The processor trains 803 a machine learning model using the training dataset. For example, the tracking server 100 uses a model trainer 205 to present examples from the training dataset to ML model 101, which may be configured to learn a function (e.g., via neural network layers, support vectors, regression coefficients, and the like) that maps signal information to tracking device movement patterns. As such, the ML model 101 may learn to predict the tracking device movement patterns upon completion of training and upon deployment and application to new/current signal information. In one embodiment, the processor trains 803 the machine learning model by identifying a mapping between tracking device cohorts and the training dataset, segmenting the training dataset based on the mapping to generate a plurality of segments of the training dataset, and training the machine learning model using a segment from the plurality of segments of training data. For example, as previously mentioned, the historical signal information may be segmented through clustering, such that an ML model relevant to each cohort can be built/trained and deployed for the tracking devices 106 in a particular tracking device cohort.

The processor accesses 804 current signal information received from the tracking device as the tracking device moves within the geographic area. For example, as the tracking device 106 moves through a geographic area while a tracked subject/object is performing a routine or other regular activities (e.g., traveling from work, home, school, etc.), the tracking device 106 scans for signals from local devices and obtains the current signal information, which may be applied directly to an ML model 101C by the tracking device 106 or stored and retrieved from a memory store by a tracking server 100 and applied to an ML model 101A.

The processor applies 805 the machine learning model to the current signal information to detect a variance from one or more predefined routines associated with the tracking device. For example, an ML model 101A, ML model 101B, or ML model 101C stored on a tracking server 100, monitoring device 102, or tracking device 106 respectively, and which may be the same ML model trained at the training 803 step, may be applied to the current signal information. The models may predict a movement pattern and detect a variance within the movement pattern that does not match a predefined routine, such as an expected travel path from school to home, work to home, or other regularly taken path when performing a regular, routine activity.

The processor sends 806 a notification to a monitoring device associated with the tracking device in response to detecting the variance from the one or more predefined routines associated with the tracking device. For example, if the ML model 101 predicts a movement pattern that varies only slightly from the predicted routine (e.g., slight difference in timing, location, and path traversed), then a notification may not be sent to the monitoring device. In one embodiment, sending a notification to a monitoring device associated with the tracking device in response to detecting the variance from the one or more predefined routine associated with the tracking device comprises comparing the variance to a tolerance and sending the notification when the detected variance is greater than the tolerance. In one embodiment, the tolerance is predefined by a user of the monitoring device. In one embodiment, the tolerance is determined by selecting an initial tolerance, sending a first notification to the monitoring device based on the initial tolerance, receiving a dismissal of the first notification, and updating the initial tolerance based on the dismissal of the first notification. For example, the dismissal may be recorded as an indication that the tolerance should be expanded, or the dismissal may be applied as input to the ML model 101 so that the tolerance of the user 103 may be learned and refined over time.

Figure 9:
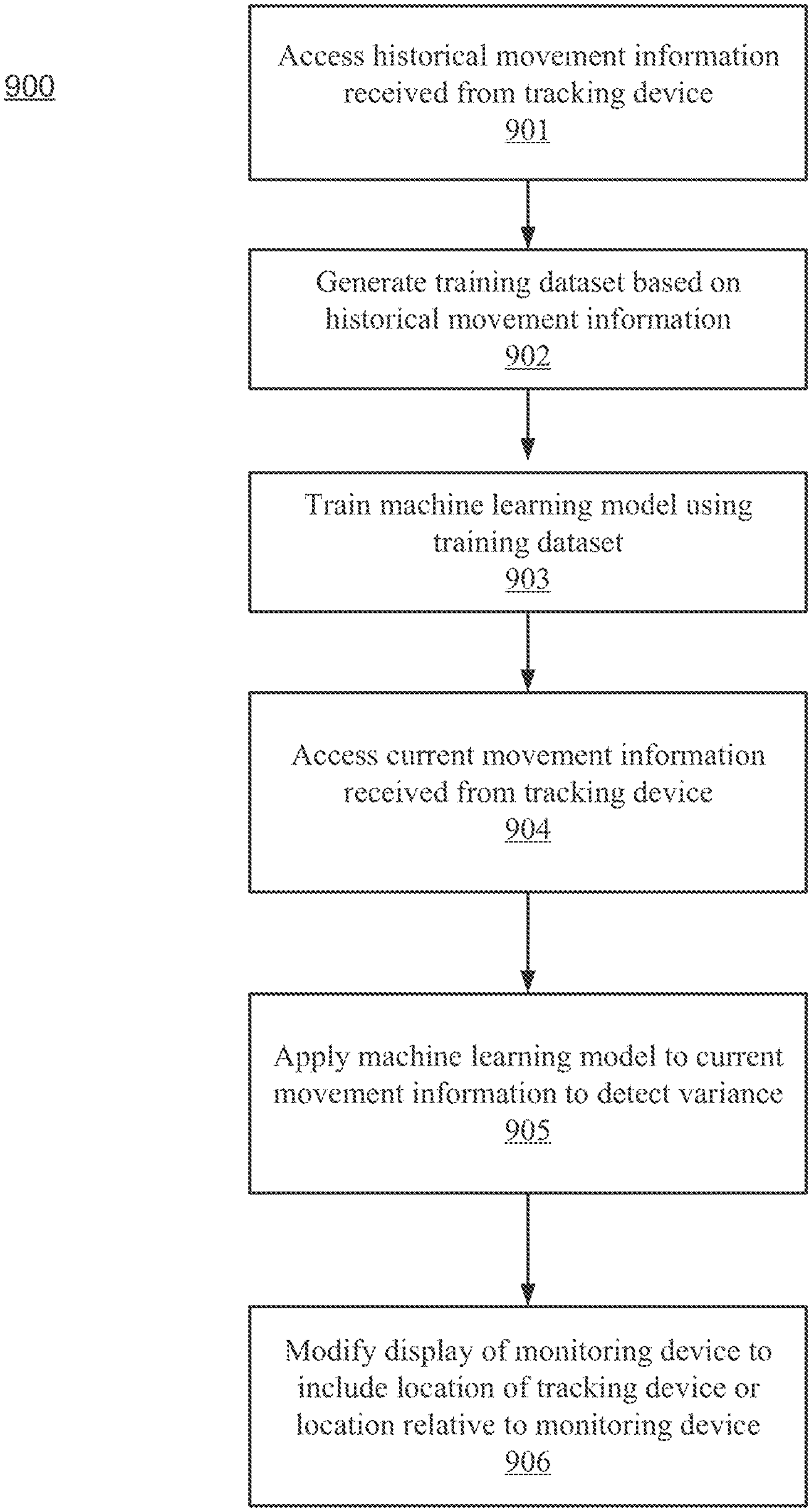
FIG. 9 illustrates a method for efficient tracking using machine-learned movement patterns, according to one embodiment.

FIG. 9 illustrates a method for efficient tracking using machine-learned movement patterns, according to one embodiment. The method 900 may be stored as instructions or code stored on a computer-readable medium (e.g., a memory or other computer storage device) and executed by one or more processors of one or more computing devices, and may cause the one or more processors to perform the method 900 when executed. The computing device may include any one of tracking server 100, monitoring device 102, tracking device 106, or some combination thereof.

The processor accesses 901 historical movement information received from a tracking device. The historical movement information can be representative of a particular tracking device's past movements, or from similar tracking devices (such as tracking devices from a particular geographic area, tracking devices from similar users, or all tracking devices from a population). Likewise, the historical movement information can also include information representative of a movement of a historical monitoring device or devices associated with one or more historical tracking devices.

The processor generates 902 a training dataset based on the accessed historical movement information. The processor then trains 903 a machine learning model using the training dataset. The machine learning model is configured to predict a location of the tracking device relative to a monitoring device associated with the tracking device. In some embodiments, the predicted location comprises an approximate location, an expected threshold distance, or a movement pattern.

The processor accesses 904 current movement information received from a tracking device. The processor applies 905 the machine learning model to the current movement information to detect a variance in a location of the tracking device relative to the monitoring device. In some embodiments, the variance is a difference between an expected location and an actual location. In some embodiments, the variance is an above-threshold difference in a predicted movement of a tracking device. The processor modifies a display of the monitoring device 906 to include the location of the tracking device relative to the monitoring device.

Embodiments described herein provide a number of technical advantages. By training a machine learning model using historical signal information of local devices scanned along paths traveled by tracking devices, tracking device movement patterns can be predicted from current signal information. If the tracking device movement patterns do not vary from routines associated with the tracking device by more than a tolerance, then a tracking device can refrain from transmitting messages to location services, alert systems, and other data and power intensive services. As a result, battery of a tracking device is conserved, and a user of a tracking device can avoid unnecessary notifications.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled via communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as components, without loss of generality. The described operations and their associated components may be embodied in software, firmware, hardware, or any combinations thereof.

Any of the steps, operations, or processes described herein may be performed or implemented with one or more hardware or software components, alone or in combination with other devices. In one embodiment, a software component is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:

accessing historical signal information received from at least one tracking device configured to scan for signals transmitted by local devices as the tracking device moves within a geographic area during each of a plurality of time intervals;

generating a training dataset based on the historical signal information received from at least the tracking device;

training a machine learning model using the training dataset by: 1) obtaining the training dataset, 2) determining a plurality of tracking device cohorts comprising one or more of geography-based tracking device cohorts or activity-based tracking device cohorts, 3) identifying a mapping between the plurality of tracking device cohorts and the training dataset, 4) segmenting the training dataset based on the mapping to generate a plurality of segments of the training dataset, and 5) training the machine learning model using a segment from the plurality of segments, wherein the machine learning model is configured to predict tracking device movement patterns;

accessing current signal information received from the tracking device as the tracking device moves within the geographic area, the current signal information comprising both transient signals from local devices within the geographic area and enduring signals that attenuate and augment based on a distance between a source of the enduring signals and the tracking device;

applying the machine learning model to the current signal information to detect a variance from one or more predefined routines associated with the tracking device based on attenuation characteristics of the enduring signals relative to the transient signals, wherein the variance comprises a movement variance that exceeds a threshold movement variance, and wherein the threshold movement variance is predicted by the machine learning model; and sending a notification to a monitoring device associated with the tracking device in response to detecting the variance from the one or more predefined routines associated with the tracking device.

2. The method of claim 1, further comprising:

receiving a subset of the historical signal information from the tracking device over an initial period of time;

applying the machine learning model to the subset of the historical information received from the tracking device over the initial period of time to predict one or more tracking device movement patterns associated with the tracking device;

mapping the predicted one or more tracking device movement patterns associated with the tracking device to a schedule;

identifying one or more candidate routines based on the mapping of the one or more movement patterns associated with the tracking device to the schedule; and selecting one or more of the candidate routines as the one or more predefined routines associated with the tracking device.

3. The method of claim 1, wherein the threshold movement variance is determined by:

selecting an initial threshold;

sending a first notification to the monitoring device based on the initial threshold;

receiving a dismissal of the first notification; and updating the initial threshold in response to the dismissal of the first notification.

4. The method of claim 1, further comprising:

predicting a new tracking device movement pattern;

identifying the new tracking device movement pattern as relating to an unmapped routine;

receiving an option or request to add the unmapped routine to the one or more predefined routines associated with the tracking device;

adding the unmapped routine to the one or more predefined routines associated with the tracking device; and mapping the unmapped routine to the new tracking device movement pattern.

5. A non-transitory computer-readable storage medium storing executable instructions that, when executed by a processor, cause the processor to perform steps comprising:

accessing historical signal information received from at least a tracking device configured to scan for signals transmitted by local devices as the tracking device moves within a geographic area during each of a plurality of time intervals;

generating a training dataset based on the historical signal information received from the tracking device;

training a machine learning model by: 1) obtaining the training dataset, 2) determining a plurality of tracking device cohorts comprising one or more of geography-based tracking device cohorts or activity-based tracking device cohorts, 3) identifying a mapping between the plurality of tracking device cohorts and the training dataset, 4) segmenting the training dataset based on the mapping to generate a plurality of segments of the training dataset, and 5) training the machine learning model using a segment from the plurality of segments, wherein the machine learning model is configured to predict tracking device movement patterns;

accessing current signal information received from the tracking device as the tracking device moves within the geographic area, the current signal information comprising both transient signals from local devices within the geographic area and enduring signals that attenuate and augment based on a distance between a source of the enduring signals and the tracking device;

applying the machine learning model to the current signal information to detect a variance from one or more predefined routines associated with the tracking device based on attenuation characteristics of the enduring signals relative to the transient signals, wherein the variance comprises a movement variance that exceeds a threshold movement variance, and wherein the threshold movement variance is predicted by the machine learning model; and sending a notification to a monitoring device associated with the tracking device in response to detecting the variance from the one or more predefined routines associated with the tracking device.

6. The non-transitory computer-readable medium of claim 5, wherein the instructions further cause the processor to:

receive a subset of the historical signal information from at least the tracking device over an initial period of time;

apply the machine learning model to the subset of the historical information received from at least the tracking device over the initial period of time to predict one or more tracking device movement patterns associated with the tracking device;

map the predicted one or more tracking device movement patterns associated with the tracking device to a schedule;

identify one or more candidate routines based on the mapping of the one or more movement patterns associated with the tracking device to the schedule; and select one or more of the candidate routines as the one or more predefined routines associated with the tracking device.

7. The non-transitory computer-readable medium of claim 5, wherein the threshold movement variance is determined by:

selecting an initial threshold;

sending a first notification to the monitoring device based on the initial threshold;

receiving a dismissal of the first notification; and updating the initial threshold based on the dismissal.

8. The non-transitory computer-readable medium of claim 5, wherein the instructions further cause the processor to:

predict a new tracking device movement pattern;

identify the new tracking device movement pattern as relating to an unmapped routine;

receive a selection to add the unmapped routine to the one or more predefined routines associated with the tracking device;

add the unmapped routine to the one or more predefined routines associated with the tracking device; and map the unmapped routine to the new tracking device movement pattern.

9. A system comprising:

a tracking device configured to scan for signals transmitted by local devices as the tracking device moves within a geographic area during each of a plurality time intervals; and a tracking server, the tracking server comprising:

a hardware processor; and a non-transitory computer-readable storage medium storing executable instructions that, when executed by the hardware processor, cause the hardware processor to perform steps comprising:

accessing current signal information received from the tracking device as the tracking device moves within the geographic area, the current signal information comprising both transient signals from local devices within the geographic area and enduring signals that attenuate and augment based on a distance between a source of the enduring signals and the tracking device;

applying a machine learning model to the current signal information to detect a variance from a predefined routine, the machine learning model trained by: 1) obtaining a training dataset, 2) determining a plurality of tracking device cohorts comprising one or more of geography-based tracking device cohorts or activity-based tracking device cohorts, 3) identifying a mapping between the plurality of tracking device cohorts and the training dataset, 4) segmenting the training dataset based on the mapping to generate a plurality of segments of the training dataset, and 5) training the machine learning model using a segment from the plurality of segments, wherein the machine learning model is configured to predict tracking device movement patterns based on attenuation characteristics of the enduring signals relative to the transient signals, and wherein the variance comprises a movement variance that exceeds a threshold movement variance, and wherein the threshold movement variance is predicted by the machine learning model; and sending a notification to a monitoring device associated with the tracking device in response to detecting the variance from the predefined routine.

10. The system of claim 9, wherein the steps performed by the hardware processor further comprise:

accessing historical signal information received from a tracking device; and generating a training dataset based on the historical signal information, wherein the machine learning model is trained using the training dataset.

* * * * *